Oct. 24, 1967  T. D. LODE  3,348,412

ALTITUDE MEASUREMENT

Filed Nov. 27, 1964

INVENTOR
TENNY D. LODE

United States Patent Office 3,348,412
Patented Oct. 24, 1967

3,348,412
ALTITUDE MEASUREMENT
Tenny D. Lode, 4925 Sherwood Road,
Madison, Wis. 53711
Filed Nov. 27, 1964, Ser. No. 414,286
7 Claims. (Cl. 73—178)

This invention relates to the measurement of aircraft altitude above the ground or other surface. More particularly it relates to such altitude measurement when relatively near the ground, such as during landing and take off. Applications include its use in automatic landing systems to provide information on when the descent path should be flared or rounded to provide a smoother landing.

The conventional barometric altimeter is widely used for the navigation of aircraft. A value for the sea level atmospheric pressure is set into the instrument, and altitude is indicated on the basis of an assumed standard relationship between the outside static air pressure and altitude. Errors may arise from several sources. The barometric pressure reported by a station will be that necessary to give the correct altitude reading at that station and at a particular time. An aircraft in flight may be some distance from the reporting station and may receive the report some time after the barometric pressure measurement was made. Aircraft above or below the altitude of the reporting station may read incorrect barometric altitudes to the extent that the actual altitude-pressure relationship varies from the assumed standard altitude-pressure relationship. In addition, there may be errors within the barometric altitude measurement instrument on board the aircraft and errors in sensing the static air pressure from a moving aircraft.

During landing, take off, and certain other low altitude maneuvers, the altitude of an aircraft above the terrain is of much greater importance than its altitude with respect to an arbitrary sea level. Terrain altimeters, using techniques such as radio or sound distance ranging, have been developed which will measure the distance of an aircraft above the ground. However, they have been undesirably complex. In addition, it is generally desirable to avoid electromagnetic radiation from an aircraft if possible, particularly in the case of military aircraft.

In recent years, there has been considerable interest in the automatic landing of aircraft under conditions of poor visibility. For a smooth landing, it is generally necessary to flare or round the aircraft's descent just before touchdown. Barometric altitude sensors of the conventional type do not provide sufficiently precise altitude information to indicate when the flare out should begin. Hence, it has generally been necessary to use some form of terrain altitude measurement in such systems. Other applications for terrain altitude measurement devices include the automatic landing of helicopters, with a similar flare out, and automatic hovering at low altitude over land or sea.

An object of the present invention is to provide relatively simple and reliable means for the measurement of the altitude of an aircraft above the earth. A further object is to provide means for terrain altitude measurement for automatic landing, take off, and flight control systems, and for automatically maintaining a desired altitude above the terrain.

A particular form of the invention, installed on a conventional fixed wing airplane, employs two outside static air tubes. One of the static air tubes is mounted on the nose of the aircraft, and the other mounted on the fuselage, generally below the wing level. In cruising flight, high above the ground, the two static air pressures will be nearly equal. In flight near the ground, the so-called ground effect will cause the static pressure measured under the wing to be higher than the static pressure measured in front of the nose. Hence, the difference in the two static pressures may be used as a measure of proximity to the ground.

Figure 1:
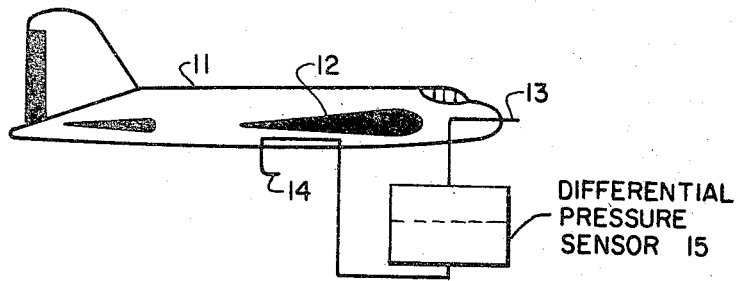
FIGURE 1 is an illustration of a first form of the invention, as installed on a conventional fixed wing airplane.

Referring now to FIGURE 1, airplane 11 with wing 12 carries static tubes 13 and 14. Static tubes 13 and 14 are of the conventional type employing side-facing ports to transmit the static air pressure via pneumatic lines to instruments 15 inside aircraft 11. The instrument 15 can be a differential pressure sensor such as that shown in Patent No. 3,271,669 which also shows readout circuitry for such a sensor. Static tube 13 transmits the static air pressure in front of the nose of aircraft 11 while static tube 14 transmits the static pressure under wing 12. Such static tubes are sometimes referred to as static air sources.

An aircraft in cruising flight, high above the ground, may be viewed as obtaining lift by imparting a downward motion to the air through which it flies. Under these conditions, the static pressure transmitted by static tube 14 will be very nearly equal to the static pressure transmitted by static tube 13. When aircraft 11 is in flight close to the ground, the air through which it flies is not free to be accelerated in a downward direction because of the presence of the ground surface. In low altitude flight, part of the lift is provided by an increase in the static pressure under wing 12. This local increased static pressure may be transmitted by static tube 14 and will be found to be significantly greater than the static pressure transmitted by static tube 13. Hence the difference in the two static pressures may be used as a measure of proximity to ground. Nearly equal static pressures transmitted by static tubes 13 and 14 will indicate a flight altitude well above the ground. As airplane 11 flies closer to the ground, the static pressure transmitted by static tube 14 will increase, relative to the static pressure transmitted by static tube 13, indicating proximity to the ground.

The term ground effect is sometimes used to describe the modification of the free air flow and pressure distribution around an aircraft due to the presence of the ground. A rule of thumb is that the ground effect will have a significant influence upon the performance of a conventional fixed wing airplane up to an altitude approximately equal to the wing span. A common result of the ground effect is a tendency of many conventional aircraft to generate lift more easily, and float above the runway surface, during the final phase of a landing. For helicopters or rotorcraft, there will be a similar influence upon performance up to an altitude approximately equal to the rotor diameter. The altitude range over which the ground effect may be used to measure altitude will depend upon the instrument sensitivity and various other factors.

Figure 2:
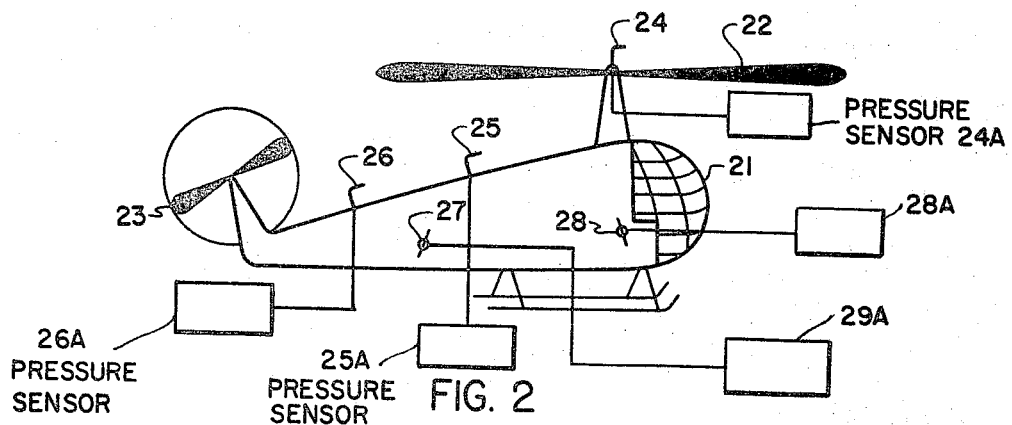
FIGURE 2 is an illustration of second, third and fourth forms of the invention, as installed on a helicopter or rotary wing aircraft.

Reference is now made to FIGURE 2 which illustrates second, third, and fourth forms of the invention as applied to a helicopter or rotary wing aircraft. In FIGURE 2, helicopter 21 is fitted with main rotor 22 and tail rotor 23. Forward facing static tube 24 is mounted above main rotor 22. Static tubes 25 and 26 are mounted on the fuselage of helicopter 21 below main rotor 22. Air flow direction sensing vanes 27 and 28 are mounted on the fuselage of the helicopter 21. Static tubes 24, 25 and 26, and vanes 27 and 28 connect to instruments 24A, 25A, 26A, 27A and 28A within helicopter 21. The instruments 24A, 25A and 26A for the static tubes may be pressure sensors such as the model 800 series made and sold by Rosemount Engineering Company, Minneapolis, Minn., or any other desired or preferred static pressure sensor and readout equipment. The differential pressure sensor shown in Patent No. 3,271,669 could also be used.

A helicopter in normal flight, above the range of ground effect, derives lift by imparting a downward motion to the air through which it flies. The static pressures above and below the main rotor are nearly equal. At low altitudes above the ground, within the range of ground effect, downward motion of air is inhibited by the presence of the ground. Within the ground effect range, a helicopter derives part of its lift from the formation of a region of increased static pressure below the main rotor(s). The direction of the air flow pattern beneath the main rotor becomes more one of horizontal outward flow from beneath the main rotor.

In a second form of the invention, the static pressures transmitted by static tubes 24 and 25 are compared. In flight at high altitudes, above the ground effect range, the static pressures transmitted by static tubes 24 and 25 will be nearly equal. In low altitude flight, within the ground effect range, the static pressure transmitted by static tube 25 will be greater than the value transmitted by tube 24 because of the restriction of downward air flow due to the proximity of the ground. Hence, the relative magnitudes of the static pressures transmitted by tubes 24 and 25 may be used as a measure of proximity to the ground.

A third form of the invention makes use of static tubes 25 and 26. The location of static tube 24 is an inconvenient one in most actual helicopters. In the third form of the invention, static tube 26 is used in place of static tube 24 for mechanical convenience. Static tube 26 is mounted on the helicopter fuselage as much outside of the main rotor disc as possible. In normal flight through free air, static tubes 25 and 26 will transmit nearly the same static pressures. At low altitude, within the ground effect range, static tube 25 will be within the increased pressure range under the rotor disc while static tube 26 will be in a region of lower pressure, higher velocity air moving out from beneath the rotor disc. Hence, the relative magnitudes of the static pressures transmitted by static tubes 25 and 26 may similarly be used as a measure of ground proximity. The first three forms of the invention as described above have made use of the variation of the air pressure pattern due to ground effect. A fourth form of the invention makes use of the variation of the air flow pattern. For a helicopter in flight at altitudes above the ground effect range, the air flow beneath the main rotor will be largely parallel and downward. Within the ground effect range, the air flow pattern beneath the main rotor becomes more one of radial outward flow. Hence, measurement of the flow direction pattern beneath the main rotor may be used as a measurement of ground proximity. In FIGURE 2, vanes 27 and 28 are similar to the movable vanes used to measure angle of attack in some types of fixed wing aircraft. The vane is free, within limits, to move and align itself with the air flow. The vane position is transmitted electrically to instruments 27A and 28A, suc has those sold in conjunction with vane sensors by Gianni Controls Corporation, Los Angeles Calif. Vane sensor and readout equipment are shown in Patent No. 2,193,077 and Patent No. 3,260,108 within the aircraft. In normal flight, at altitudes above the ground effect range, the air flow directions indicated by vanes 27 and 28 will be nearly parallel. Within the ground effect range, the airflow directions sensed by vanes 27 and 28 will become more divergent as the air flow pattern beneath rotor 22 becomes more one of radial outflow. Hence, the directions of air flow beneath the main rotor, as measured by sensors such as vanes 27 and 28, may be used as a measure of ground proximity.

Figure 3:
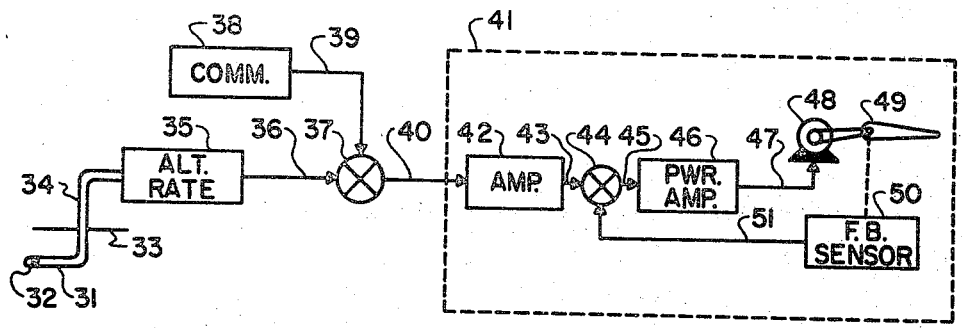
FIGURE 3 is a schematic illustration of a fifth form of the invention, used as an input for an automatic pilot for automatic aircraft landing control.

Reference is now made to FIGURE 3 which illustrates a fifth form of the invention used as an input for an automatic pilot for aircraft landing. In FIGURE 3, static tube 31 with side facing static port 32 is mounted outside the skin 33 of an aircraft. Static tube 31 will preferably have a number of static ports in addition to port 32, which are not visible in FIGURE 3. Static tube 31 is mounted below the wing level of the aircraft, for example, in the location of static tube 14 of FIGURE 1. Static tube 31 is connected via pneumatic line 34 to the input of altitude rate sensor 35. The output of rate sensor 35 is an electrical signal which is connected via line 36 to a first input of summing junction 37. Command signal source 38 is connected via line 39 to a second input of summing junction 37. Command signal source 38 may be, for example, a manually set potentiometer connected to a voltage source. The output of summing junction 37 on line 40 connects to automatic pilot 41. Within automatic pilot 41, line 40 connects to the input of amplifier 42. The output of amplifier 42 on line 43 connects to a first input of summing junction 44. The output of summing junction 44 connects via line 45 to power amplifier 46, the output of which connects via line 47 to servomotor 48. Servomotor 48 is mechanically connected to aircraft elevator surface 49 which is in turn mechanically connected to feedback sensor 50. The electrical output of feedback sensor 50 connects via line 51 to a second input of summing junction 44. Feedback sensor 50 may be, for example, a potentiometer connected to a voltage source.

Autopilot 41 is a simplified representation of a conventional pitch axis autopilot for a fixed wing aircraft. A signal applied on line 40 will pass through amplifier 42, summing junction 44 and amplifier 46 causing motor 48 to move elevator surface 49. As elevator surface 49 moves, the changing output of feedback sensor 50 on line 51 will oppose the signal on line 43. Elevator surface 49 will continue to move until the feedback signal on line 51 corresponds to the signal on line 43. Thus, autopilot 41 is a conventional position servosystem in which the position of elevator surface 49 is varied in accordance with an input signal on line 40. Amplifiers 42 and 46 are provided with whatever time or frequency domain filtering is necessary to obtain system stability.

Rate sensor 35 provides an electrical signal corresponding to the rate of change of the barometric altitude corresponding to the pressure transmitted by static tube 31. Command signal source 38 provides a voltage signal on line 39 corresponding to the desired rate of altitude change. In flight above the range of ground effect, the system of FIGURE 3 will automatically control the rate of climb or descent of an aircraft at a desired value. If the command signal on line 39 corresponds to, for example, a descent of 500 feet per minute, autopilot 41 will cause the aircraft to descend so that the output of rate sensor 35 also corresponds to a 500 foot per minute descent and the signal on line 40 returns to null. If the aircraft descends in this manner into the ground effect range, static tube 31 will begin to transmit a static pressure corresponding to an altitude significantly below the actual aircraft altitude because of the increased static pressure due to ground effect. The system of FIGURE 3 will control the aircraft flight path so that the apparent pressure altitude of static tube 31 continues to descend at a constant rate. As the aircraft descends into the ground effect range, the actual descent path must be rounded or flared if the pressure altitude transmitted by tube 31 is to continue decreasing at a constant rate. Hence, the system of FIGURE 3 will control an aircraft at a constant descent rate in free air and will automatically flare the descent path before final touchdown.

The preceding specification has described the use of static pressure tubes at various locations and air flow direction sensing vanes for the measurement of the distortion of the air flow and pressure pattern around an aircraft in flight due to the proximity of the ground. Sensor locations other than those specifically illustrated may be employed. For example, static tube 14 of FIGURE 1 is shown mounted on the bottom of the fuselage of airplane 11. A static tube performing similar functions may be mounted on the side of the fuselage, in the case of a high wing aircraft, or on the lower surface of the wing. Air pressure and flow direction sensors other than those specifically described may also be employed. For example, several pilot tubes facing in various directions or an aerodynamic shape with ports facing in various directions may be used to measure the direction of air flow without moving mechanical parts.

For convenience, the preceding description has been in terms of the measurement of altitude above the ground. The invention is not limited to operation above land, as similar results may be obtained measuring the altitude above the surface of the ocean or the deck of an aircraft carrier.

The preceding description has implied the measurement of the altitude of a fixed or rotary wing aircraft above the ground or other surface. The invention may also be used for the measurement of the altitude of a jet or rocket vehicle supported above the ground or other surface by a downward directed jet or rocket exhaust. In this latter case, the altitude measurement will be made by the measurement of the distortion of the normal free flight jet or rocket exhaust pattern due to the presence of the surface.

What is claimed is:

1. Means for measuring the relative altitude of an aircraft in flight above a surface including means for measuring a first static air pressure in an area beneath the wing level of said aircraft, means for measuring a second static air pressure in an area less beneath the wing than the area of said first pressure, and means for comparing the magnitudes of said first and second measured static pressures.

2. Means for measuring the relative altitude of an aircraft in flight above a surface including first means for measuring the static pressure at a first point, second means for measuring the static pressure at a second point, said first point being located in a first region in proximity to a wing of the aircraft and subject to a substantial portion of the ground effect static pressure rise, and said second point being located in a second region adjacent the aircraft subject to a substantially lesser ground effect static pressure rise, and means for comparing the magnitudes of said two measured static pressures.

3. Means for measuring the relative altitude of a fixed wing aircraft in flight above a landing surface including first means for measuring a first static pressure at a first point, second means for measuring a second static pressure at a second point, said first point being more beneath a wing of said aircraft than said second point, and means for comparing the magnitudes of said measured first and second static pressures.

4. Means for measuring the relative altitude of a rotary wing aircraft in flight above a surface including first means for measuring a first static pressure at a first point, second means for measuring a second static pressure at a second point, said first point being more beneath a lifting region of a rotary wing of said aircraft than said second point, and means for comparing the magnitudes of said measured first and second static pressures.

5. The method of measuring the proximity of a vehicle in flight to a surface, said vehicle deriving substantial support from a downwardly directed blown gaseous stream, including the measurement of the gas flow and pressure pattern associated with said blown gaseous stream around said vehicle at a first location between some portion of the vehicle and the surface, and comparing the measurement with the gas flow and pressure pattern at a second location which is influenced to a different extent than at the first location by the proximity of the vehicle to the surface.

6. Means for measuring the relative altitude of an aircraft in flight above a surface, said aircraft deriving substantial support from a downwardly directed blown airstream including first indicating means responsive to the direction of air flow associated with said blown airstream at a first location, second indicating means responsive to the direction of air flow at a second location, said first and second locations being positioned adjacent the aircraft so that in normal flight the air flows are at a first angular relationship to each other and when the aircraft is near the ground the air flows are at a different angular relationship to each other, and means for comparing the angular direction of air flow measured at said two locations.

7. Means for measuring the relative altitude of an aircraft in flight above a surface, said aircraft deriving substantial support from a downwardly directed blown air stream, including means for measuring an air data parameter associated with said blown air stream which changes when the aircraft is proximate the ground in a first area beneath the wing level of said aircraft, means for measuring the same air data parameter in a second area less beneath the wing than the first area, and means for comparing the measurements of the parameters at said first and second area.

References Cited

UNITED STATES PATENTS

| | | | |
|---|---|---|---|
| 1,504,785 | 8/1924 | Reynolds | 73—180 |
| 2,297,412 | 9/1942 | Hoppe | 73—178 |
| 2,352,955 | 7/1944 | Johnson | 73—180 |
| 2,873,418 | 2/1959 | Owen | 244—77 X |
| 2,986,033 | 5/1961 | Spencer | 73—180 |
| 3,006,187 | 10/1961 | Wilkenson | 73—180 |
| 3,070,332 | 12/1962 | Hess | 244—77 |
| 3,147,424 | 9/1964 | Miller | 244—77 |
| 3,240,446 | 3/1966 | Miller | 244—77 |
| 3,250,121 | 5/1966 | Schwartz | 73—177 |
| 3,260,108 | 7/1966 | Kaminskas | 73—178 |

LOUIS R. PRINCE, *Primary Examiner.*

D. D. WOODIEL, *Assistant Examiner.*